(12) United States Patent
Wu

(10) Patent No.: US 6,954,221 B2
(45) Date of Patent: Oct. 11, 2005

(54) SAFETY STRUCTURE OF A DESK TOP LCD

(76) Inventor: Alpha Wu, PO Box 82-144, Taipei (TW)

( * ) Notice: Subject to any disclaimer, the term of this patent is extended or adjusted under 35 U.S.C. 154(b) by 288 days.

(21) Appl. No.: 10/247,716

(22) Filed: Sep. 20, 2002

(65) Prior Publication Data

US 2004/0056836 A1 Mar. 25, 2004

(51) Int. Cl.$^7$ ............................................. E05C 17/64
(52) U.S. Cl. ........................ 345/905; 345/31; 345/87; 345/904; 16/337; 16/374; 248/917; 248/919; 248/920; 248/921; 248/922; 248/923; 361/681
(58) Field of Search ........................... 345/87, 31, 904, 345/905; 16/337, 343, 374; 248/917, 919, 920, 921, 922, 923; 361/681

(56) References Cited

U.S. PATENT DOCUMENTS 5,398,991 A * 3/1995 Smith et al. ............ 297/188.16

6,532,628 B2 * 3/2003 Kim ............................. 16/342
2001/0048584 A1 * 12/2001 Rosen ......................... 361/681

* cited by examiner

Primary Examiner—Bipin Shalwala
Assistant Examiner—Vincent E. Kovalick
(74) Attorney, Agent, or Firm—Leong C. Lei

(57) ABSTRACT

A safety structure of a desk-top Liquid Crystal Display (LCD) is disclosed. The safety structure has a seat body pivotally mounted to a monitor, characterized in that the monitor is provided with two sections of elevation angle, wherein the first section of the elevation angle complies with the angle of application for human body, and the second section of the elevation angle has a maximum elevation angle in parallel to a base seat of the monitor, and the twisting force of the monitor required to rotate within the scope of elevation angle of the second section is larger than that of the elevation angle of the first section, but the twisting force to rotate within the second section is smaller than the weight of the seat body.

7 Claims, 10 Drawing Sheets

SAFETY STRUCTURE OF A DESK TOP LCD

BACKGROUND OF THE INVENTION (a) Technical Field of the Invention

The present invention relates to a safety structure, and in particular a safety structure of a desk top LCD such that the desk top LCD is prevented from toppling when the monitor is turned to an inclination angle.

(b) Description of the Prior Art

Referring to FIG. 1, there is shown a convention desk top LCD having a chain 12 to mount a monitor 11 onto a base seat 10 such that the monitor can be adjusted with respect to an inclination or an elevation angle. The conventional inclination/elevation angle is normally 5 to 20 degree, and the drawbacks of such convention structure are as follows:

(a) The monitor can be easily toppled. The conventional monitor has a small adjustable angle and if a large force is applied to adjust the inclination/elevation angle, the monitor may be toppled.

(b) Large packaging space. As the range of angle of rotating of the conventional monitor is limited, it takes a big space to pack for shipping.

In view of the above, it is an object of the present invention to provide a safety structure of a desk-top Liquid Crystal Display (LCD) which can solve the above-mentioned drawbacks.

SUMMARY OF THE INVENTION

Accordingly, it is an object of the present invention to provide a safety structure of a desk-top Liquid Crystal Display (LCD) having a seat body pivotally mounted to a monitor, characterized in that the monitor is provided with two sections of elevation angle, wherein the first section of the elevation angle complies with the angle of application for human body, and the second section of the elevation angle has a maximum elevation angle in parallel to a base seat of the monitor, and the twisting force of the monitor required to rotate within the scope of elevation angle of the second section is larger than that of the elevation angle of the first section, but the twisting force to rotate within the second section is smaller than the weight of the seat body.

An aspect of the present invention is to provide a safety structure of a desk-top Liquid Crystal Display (LCD) having a seat body pivotally mounted to a monitor and the pivoting device being a securing frame having two sides mounted corresponding with a chain, wherein the securing frame is fixed to the monitor and the two lateral sides of the securing frame are each provided with a protruded lug having provided with pivotal hole, and one side of the pivotal hole is provided with a limiting hole and the peripheral edge of the protruded lug is provided with a positioning notch; the chain includes a rotating shaft, a first section limiting plate, a second section limiting plate, a securing plate, a plurality of elastic pads, a plurality of damping plates, a top pressing pad, and a securing nuts, wherein the rotating shaft includes a combining section for mounting onto the seat body, and the upper section of a pivotal shaft is an engaging flat section and in turn passes through the first section limiting plate, a damping pad, a second section limiting plate, a damping pad, a pivotal hole on the protruded lug, a damping pad and a securing plate, and a threaded shaft is provided at one lateral side of the pivotal shaft, and in sequence, mounted with two elastic pads, a top pressing pad, and a securing nut; the first section limiting plate is mounted the pivotal shaft and is rotatable thereon and at one lateral side of the plate has a first limiting arm the first limiting arm is extended through the limiting hole of the protruded lug; the second section limiting plate is fixed at the pivotal shaft and is rotatable thereon and one lateral side of the plate has a second limiting arm and the second limiting arm is extended to the positioning notch at the circumferential edge of the protruded lug; the securing plate is mounted onto the pivotal shaft and is rotatable thereon, and one lateral side is provided with an engaging slot for the passing through of the first limiting arm of the limiting hole for mounting; the elastic pad is mounted onto the threaded shaft rod section of the pivotal shaft; a plurality of damping pads are respectively between the first limiting plate and the second limiting plate, the second limiting plate and the protruded lug, the protruded lug and the securing plate; the top pressing pad is located at the external side of the elastic plate; and the securing nut is screwed to the threaded shaft rod.

A further object of the present invention is to provide a safety structure of a desk-top Liquid Crystal Display (LCD), wherein the first section elevation angle is 5 degree of inclination to 20 degree of elevation angle, and the twisting force for rotation is about 11 to 16 kg/cm, and the second section elevation angle is inclination angle of 20 degree and the elevation angle of 90 degree, and the twisting force for rotation is about 45 to 55 kg/cm.

Other object and advantages of the present invention will become more apparent from the following description taken in conjunction with the accompanying drawing.

DETAILED DESCRIPTION OF THE PREFERRED EMBODIMENT

Figure 1:
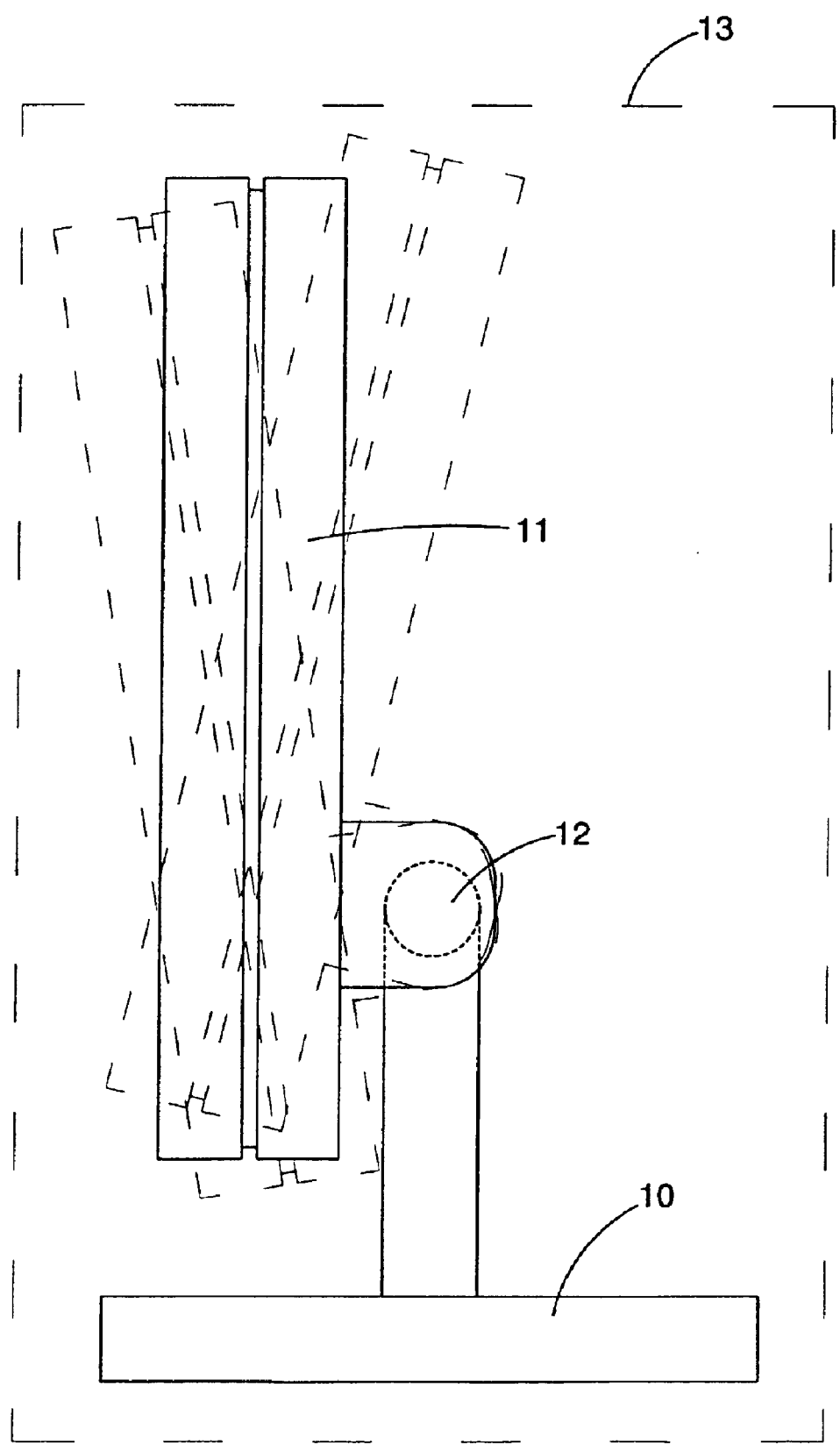
FIG. 1 is a conventional desk top LCD.
Figure 2:
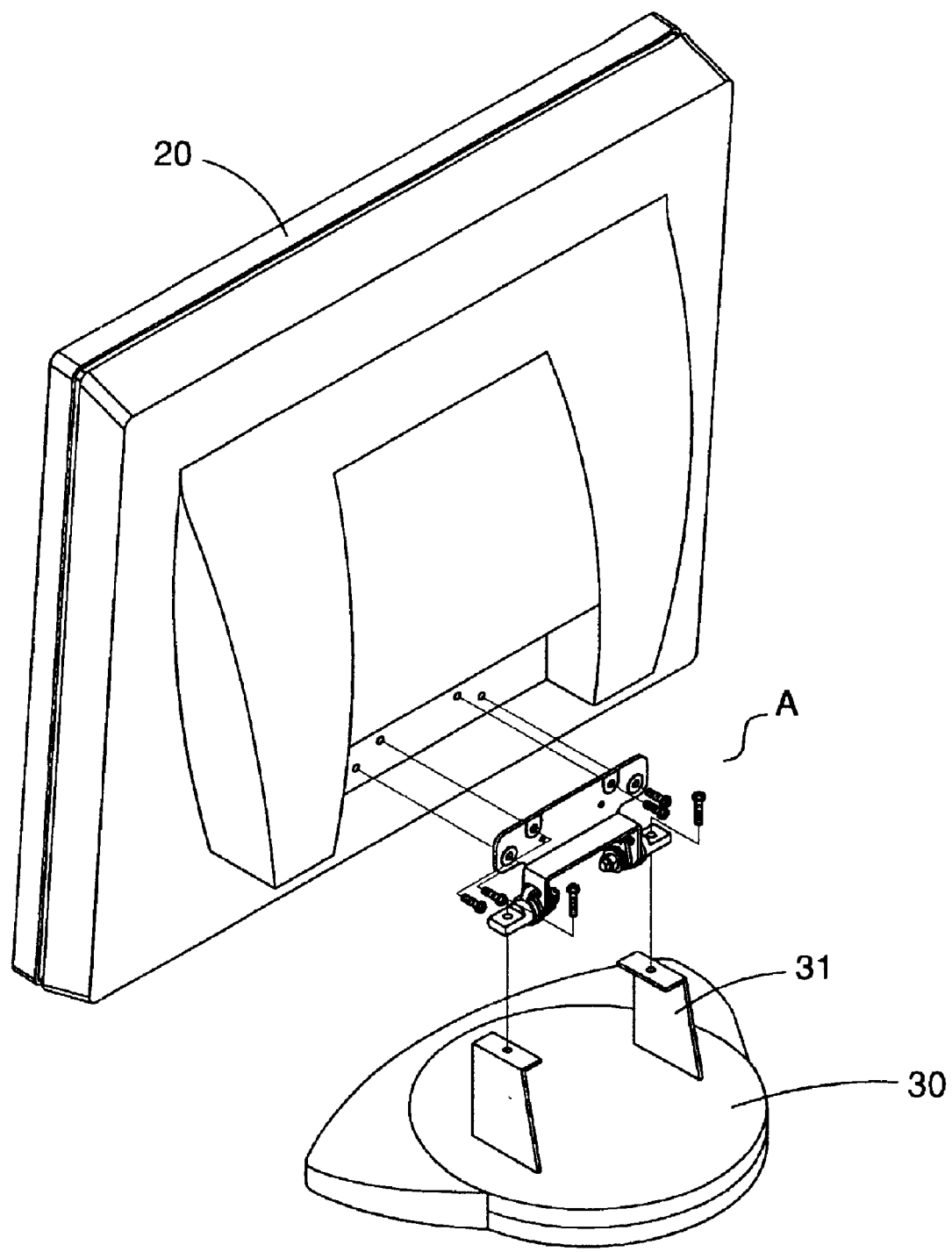
FIG. 2 is a perspective exploded view in accordance with the present invention.
Figure 3:
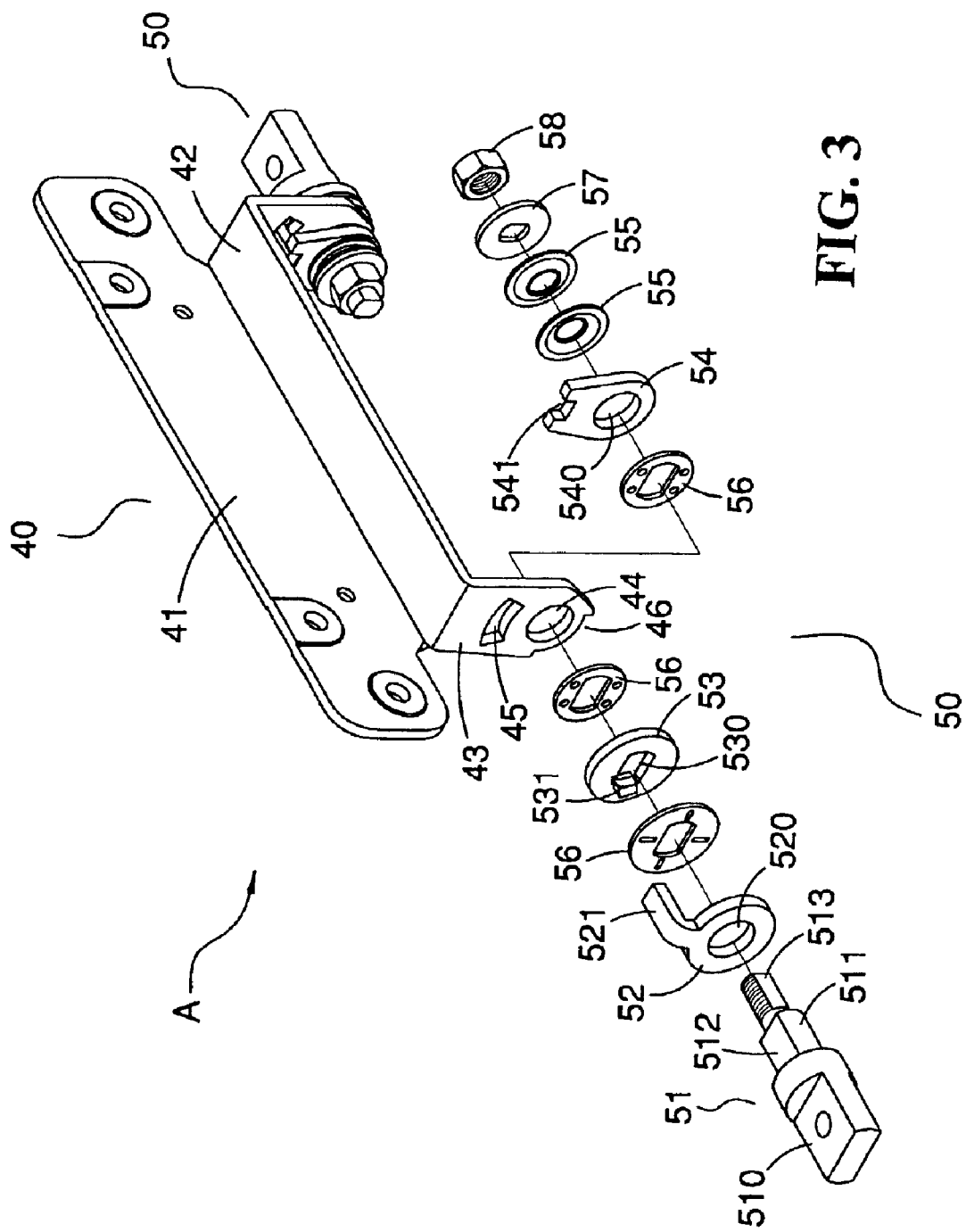
FIG. 3 is a perspective exploded view of a chain in accordance with the present invention.
Figure 4:
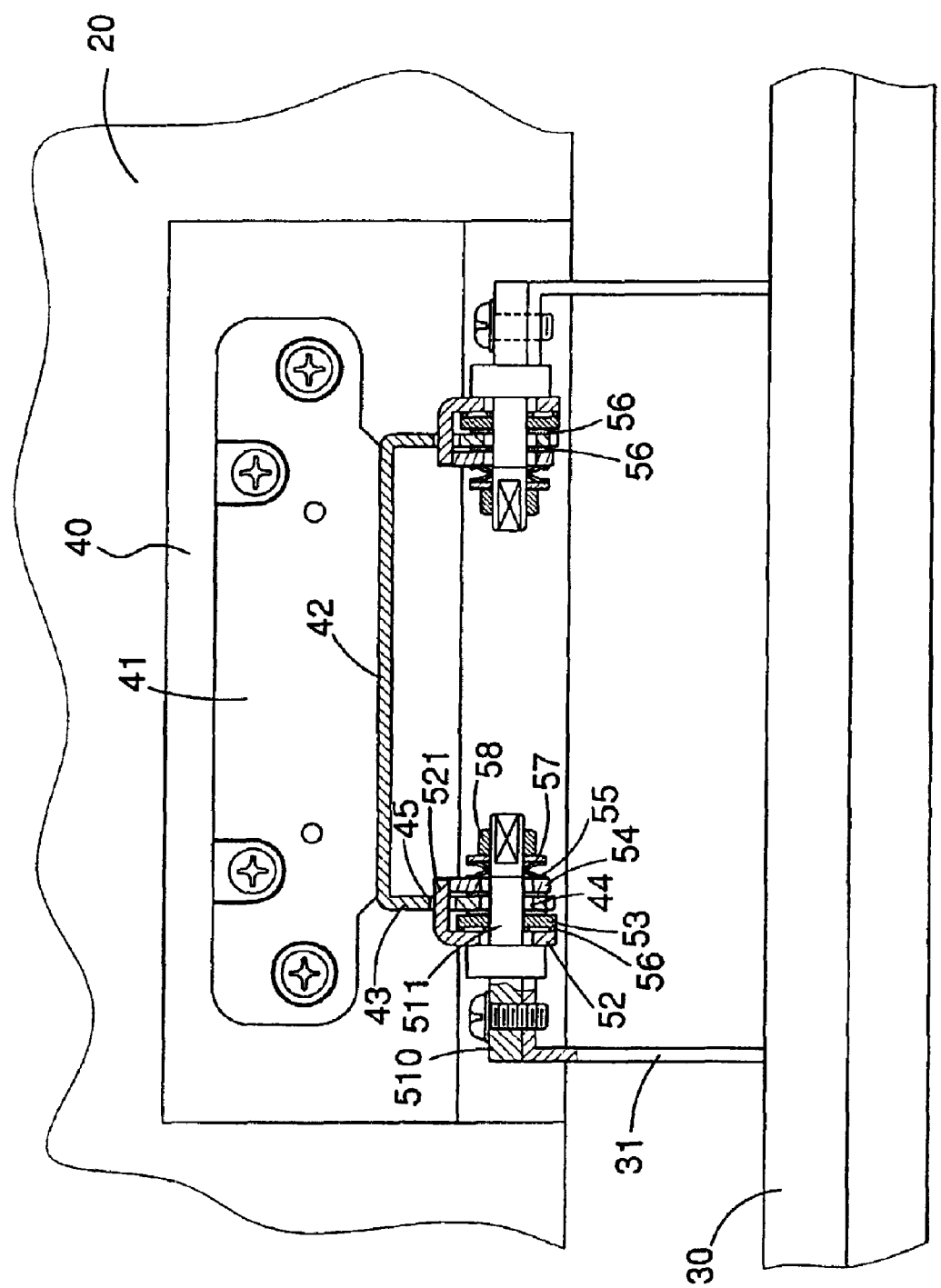
FIG. 4 is a sectional view of the present invention.
Figure 5:
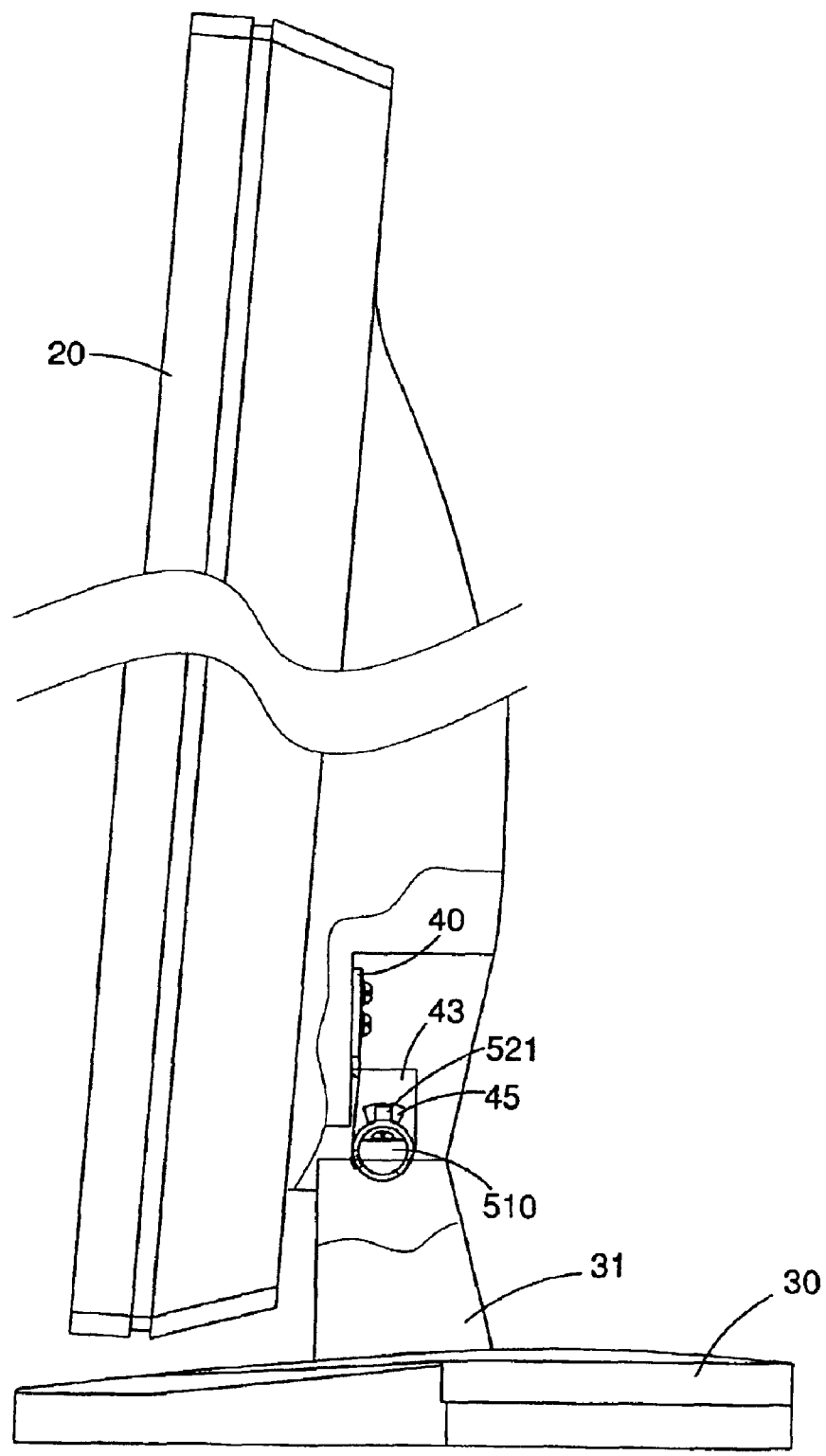
FIG. 5 is a lateral view of the present invention.

Referring to FIGS. 2 to 4, there is shown a safety structure of a desk-top Liquid Crystal Display (LCD) having a pivoting device A for pivotal mounting of a monitor 20 onto a side arm 31 of a seat body 30, and as shown in FIG. 3, the two lateral sides of a securing frame 40 are respectively mounted with a chain 50, wherein the securing frame 40 includes a securing plate 41 for the securing of the monitor 11, and a support plate 2 having the two lateral sides, each being provided with a protruded lug 43 having provided with pivotal hole 44 thereon for the pivotal mounting of the chain 40, and one side of the pivotal hole 44 is provided with an arch-shaped limiting hole 45. The peripheral edge of the protruded lug 43 is provided at an appropriate position with an arch-shaped positioning notch 46, and the arch length of the positioning notch 46 is larger than the limiting hole 45.

The chain 50 includes a rotating shaft 51, a first section limiting plate 52, a second section limiting plate 53, a securing plate 54, a plurality of elastic pads 55, a plurality of damping plates 56, a top pressing pad 57, and a securing nut 58, wherein the rotating shaft 51 includes a combining section 510, a pivotal shaft 511 and a threaded shaft rod 513, wherein the combining section 510 for mounting onto the support arm 31 with screw 514, and the pivotal shaft 511 has an engaging flat section 512 and in turn passes through the first section limiting plate 53, a damping pad 56, a second section limiting plate 53, a damping pad 56, a pivotal hole 44 on the protruded lug 43, a damping pad 56 and a securing plate 54, and a threaded shaft 513 is provided at one lateral side of the pivotal shaft 511, and in sequence, mounted with two elastic pads 55, a top pressing pad 57, and a securing nut 58.

The first section limiting plate 52 is provided with a circular through hole 520 for the mounting onto the pivotal shaft 511, and one lateral side of the plate has a first limiting arm 521, and the first limiting arm 521 is extended through the limiting hole 45 of the protruded lug 43.

The second section limiting plate 53 is provided with a mounting hole 530 and the shape of the mounting hole 530 is the same shape of the cross section of the pivotal shaft 511 so as to allow the rotation of the pivotal shaft 511 and one lateral side of the plate has a second limiting arm 531 and the second limiting arm 531 is extended to the positioning notch 46 at the circumferential edge of the protruded lug 43.

The securing plate 54 is provided with a circular hole 540 for the mounting onto the pivotal shaft 511 and is rotatable thereon, and one lateral side is provided with an engaging slot 541 for the passing through of the limiting hole 45 of the first limiting arm 521 for mounting.

The elastic pad 55 is mounted onto the threaded shaft rod section 513 of the pivotal shaft 511.

A plurality of damping pads 56 are respectively located between the first limiting plate 52 and the second limiting plate 53, the second limiting plate 53 and the protruded lug 43, the protruded lug 43 and the securing plate 54.

The top pressing pad 57 is located at the external side of the elastic plate 55, and the securing nut 58 is screwed to the threaded shaft rod 513 so as to allow the rotating shaft 51, the first section limiting plate 52, the second section limiting plate 53, the securing plate 54, a plurality of elastic pads 55, a plurality of damping pads 56 and the top pressing pad 57 to be screwed on to the protruded lug 43.

Figure 6:
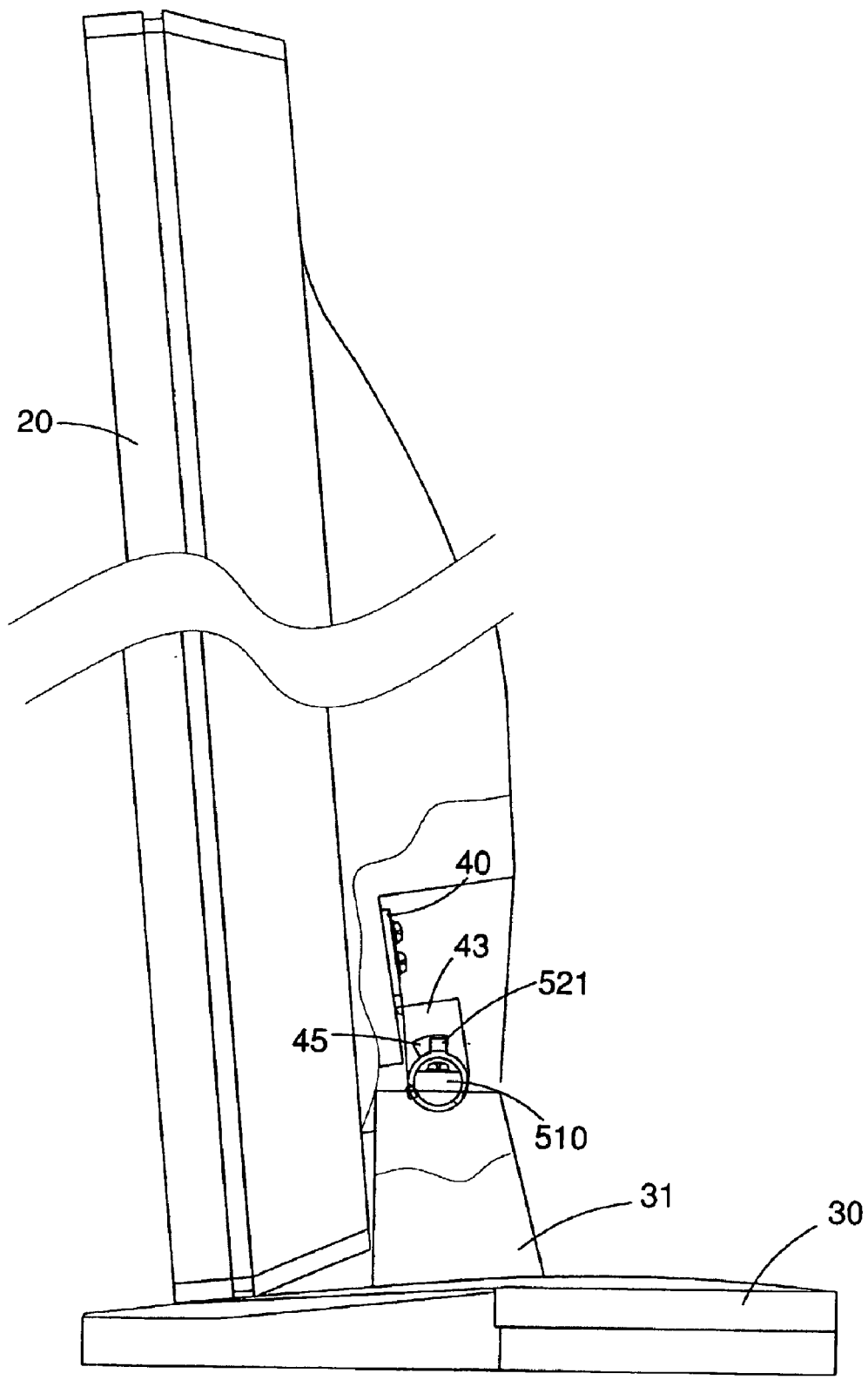
FIG. 6 is a schematic view showing the forward inclined at the first section inclination/elevation angle in accordance with the present invention.
Figure 7:
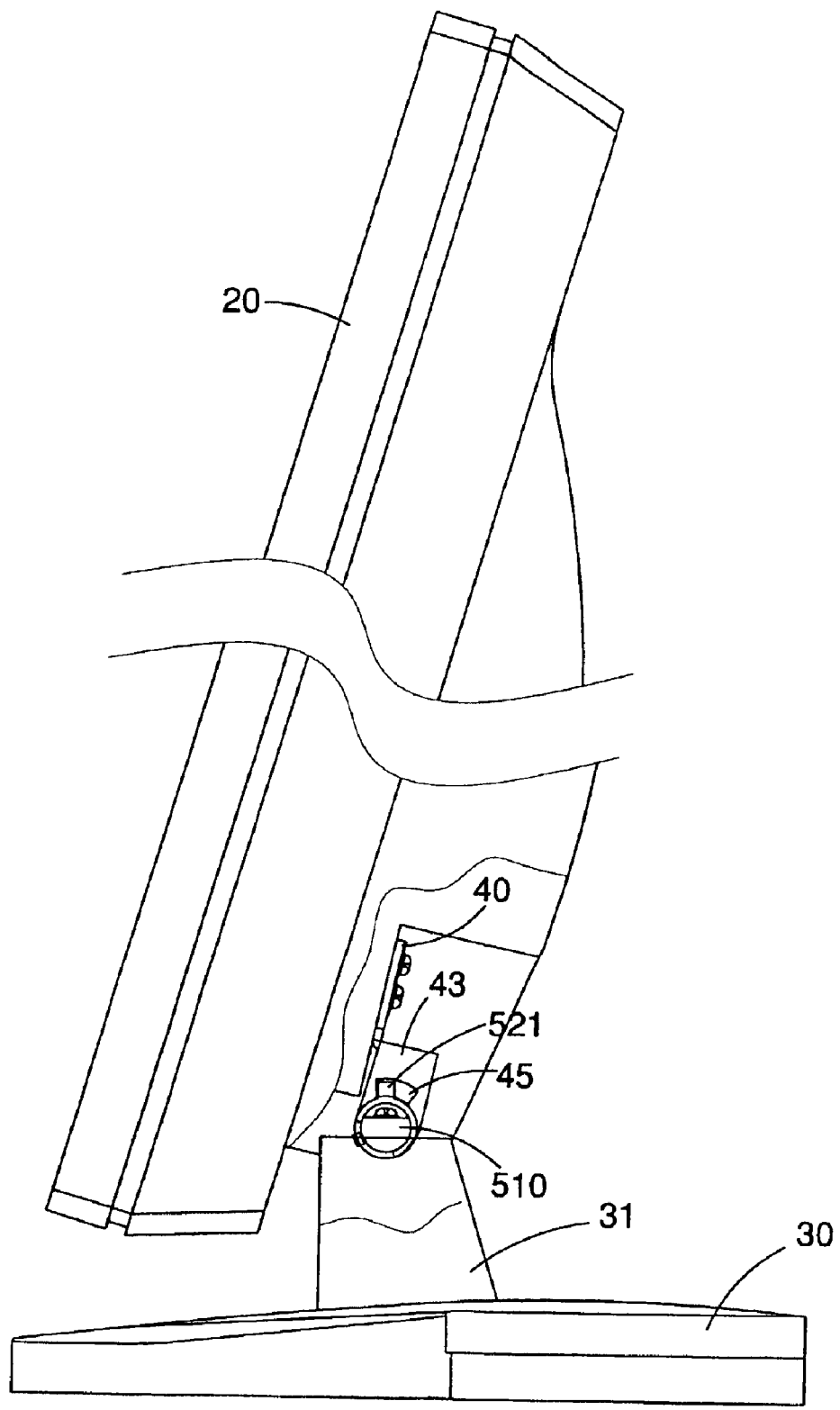
FIG. 7 is a schematic view showing the backward inclined at the first section inclination/elevation angle in accordance with the present invention.

Referring to FIGS. 4 to 7, when the monitor 20 is pressed forward, the monitor 20 will rotate to an elevation of 5 degree at maximum as a result of the protruded lug 43. When one lateral top of the limiting hole 45 urges to the first limiting arm 521, the monitor 20 will not move further (as shown in FIG. 6). When the monitor 20 is pressed at the rear side, the monitor 11 will move at an appropriate inclination angle as a result of the protruded lug 43 at a maximum of 20 degree. That is when other lateral top of the limiting hole urges the first limiting arm 521, the angle of rotating is 5 to 20 as this is the first section of the angle (as shown in FIG. 7). The required twisting force to provide rotating is that the force is slightly larger than the total frictional force of the second limiting plate 53 and the protruded lug 43 and the protruded lug 43 and the securing plate 54 with the damping pad 56, that is the force is about 11 to 16 kg/cm.

Figure 8:
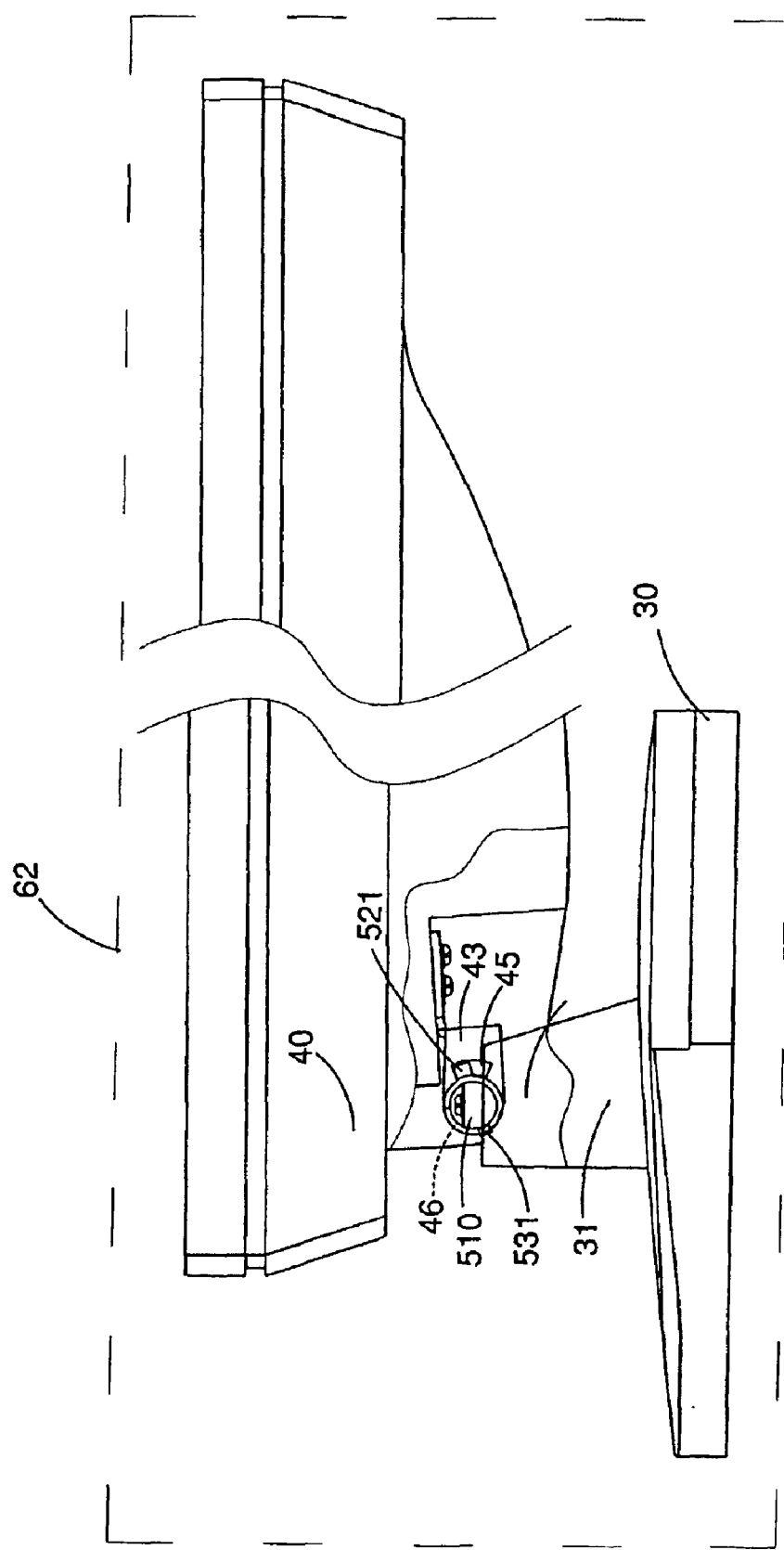
FIG. 8 is a schematic view showing the action of the monitor within the range of second section inclination/elevation angle in accordance with the present invention.

Referring to FIGS. 3, 4, and 8, when the monitor 20 is pressed at the rear end to the maximum angle of inclination, and then a force is further applied, the protruded lug 43 will drive the first limiting plate 52 to rotate. When the protruded lug 45 is rotated to an appropriate angle, one lateral wall of the positioning notch 46 will urge the second limiting arm 531 and the limiting plate 53 will not rotate as the pivotal shaft 511 is secured to the side arm 3 of the seat body 30. The monitor 20 will rotate and position at 90 degree, and the angle between 20 to 90 is the second section of elevation angle (as shown in FIG. 8). The twisting force required for rotating at the second section of the elevation angle is slightly larger than the total friction force between the first limiting plate 52 and the second limiting plate 53, the second limiting plate 53 and the protruded lug 43, and the protruded lug 43 and the securing plate 54 with the damping pads 56, and the total is about 45 to 55 kg/cm, and the twisting force is smaller than the weight of the seat body 30 so as to cause the rotating at second section rotating but the set body will not rotate.

Figure 9:
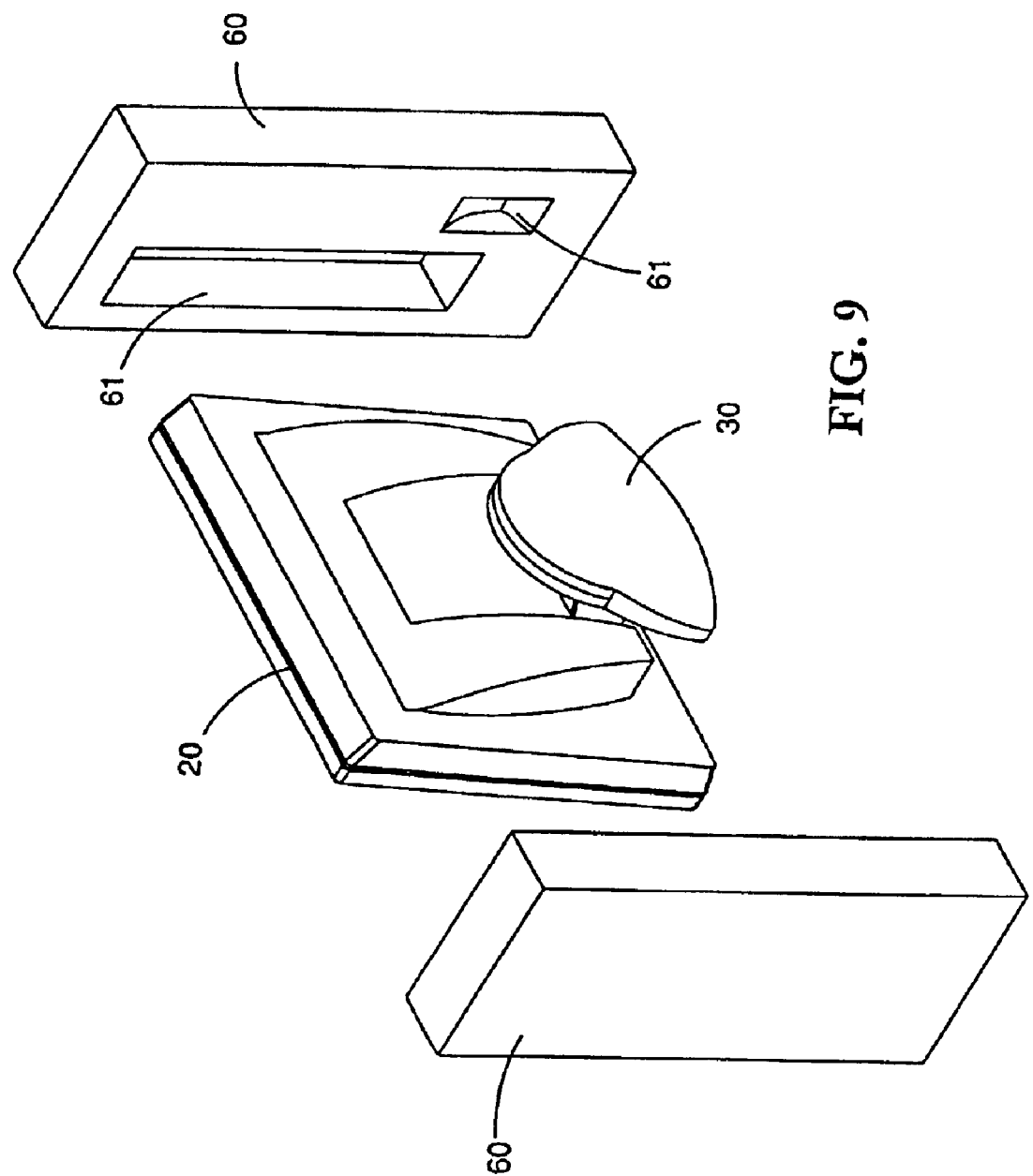
FIG. 9 is shows the present invention together with foamed material in accordance with the present invention.

Referring to FIG. 9, in the case when the monitor 20 and the seat body 30 are to be packed in parallel together with foamed material 60 into a package box 62, the foamed material 60 is placed into the engaging slot 61 for the positioning of the monitor 20 and the seat body 30.

Figure 10:
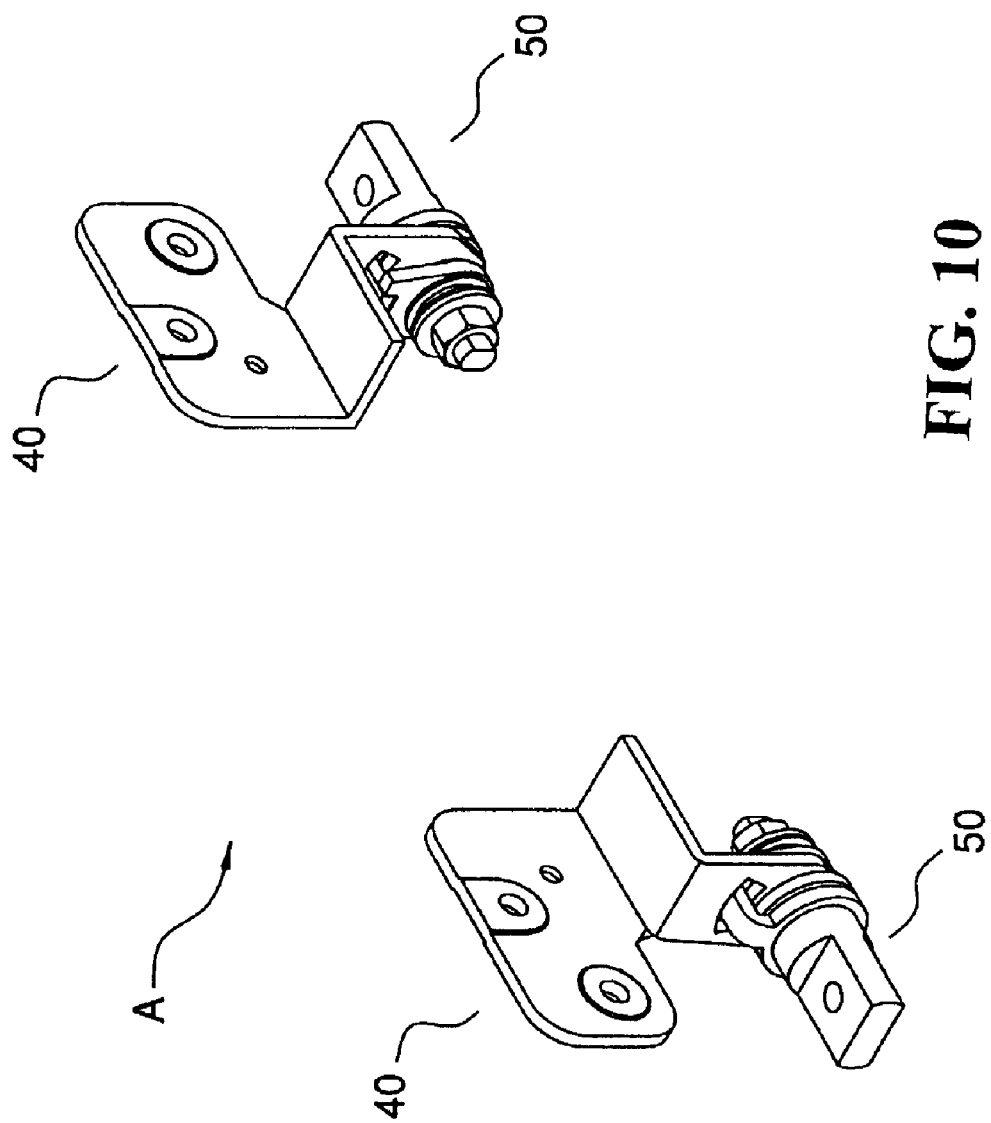
FIG. 10 is another preferred embodiment in accordance with the present invention.

Referring to FIG. 10, the pivotal device A can be two separate securing frames 40 having a chain mounted thereto.

The advantages of the present invention are as follows:

(1) The monitor will not be toppled as a result of external force. As the monitor 20 can be pushed backward to a larger angle of elevation, and the center of gravity is thus lowered, the toppling of the monitor is avoided.

2) Smaller packaging space. The monitor 20 can be rotated so as to be located in parallel to the seat body 30, the capacity of the package is reduced. Thus the depth of the packing box 62 and the foamed material is greatly reduced and the foamed material needed is lesser.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A safety structure of a desk-top Liquid Crystal Display (LCD) having a seat body pivotally mounted to a monitor and the pivoting device being a securing frame having two sides mounted corresponding with a chain, wherein the securing frame is fixed to the monitor and the two lateral sides of the securing frame are each provided with a protruded lug having provided with pivotal hole, and one side of the pivotal hole is provided with a limiting hole and the peripheral edge of the protruded lug is provided with a positioning notch; the chain includes a rotating shaft, a first section limiting plate, a second section limiting plate, a securing plate, a plurality of elastic pads, a plurality of damping plates, a top pressing pad, and a securing nuts, wherein the rotating shaft includes a combining section for mounting onto the seat body, and the upper section of a pivotal shaft is an engaging flat section and in turn passes through the first section limiting plate, a damping pad, a second section limiting plate, a damping pad, a pivotal hole on the protruded lug, a damping pad and a securing plate, and a threaded shaft is provided at one lateral side of the pivotal shaft, and in sequence, mounted with two elastic pads, a top pressing pad, and a securing nut; the first section limiting plate is mounted the pivotal shaft and is rotatable thereon and at one lateral side of the plate has a first limiting arm, the first limiting arm is extended through the limiting hole of the protruded lug; the second section limiting plate is fixed at the pivotal shaft and is rotatable thereon and one lateral side of the plate has a second limiting arm and the second limiting arm is extended to the positioning notch at the circumferential edge of the protruded lug; the securing plate is mounted onto the pivotal shaft and is rotatable thereon, and one lateral side is provided with an engaging slot for the passing through of the first limiting arm of the limiting hole for mourning; the elastic pad is mounted onto the threaded shaft rod section of the pivotal shaft; a plurality of damping pads are respectively between the first limiting plate and the second limiting plate, the second limiting plate and the protruded lug, the protruded lug and the securing plate; the top pressing pad is located at the external side of the elastic plate; and the securing nut is screwed to the threaded shaft rod.

2. The safety structure of claim 1, wherein the limiting hole is an arch-shaped hole and the positioning notch is an arch-shaped notch and the arch length of the positioning notch is larger than the limiting hole.

3. The safety structure of claim 1, wherein the monitor is provided with a first section and second section elevation/inclination angle by means of the limiting hole and the first limiting arm in association with the positioning notch and the combination of the second arm position.

4. The safety structure of claim 3, wherein the scope of the first section elevation/inclination angle is 5 to 20 degree and the scope of the second section elevation/inclination angle is 20 to 90 degree.

5. The safety structure of claim 3, wherein the twisting force needed to rotate within the range of the second section angle is larger than that of the second section angle, but is smaller than the weight of the seat body.

6. The safety structure of claim 1, wherein the pivotal device includes two separate fixing frames, each having a chain.

7. A safety structure of a desk-top Liquid Crystal Display (LCD) having a seat body pivotally mounted to a monitor, characterized in that the monitor is provided with two sections of elevation angle, wherein the first section of the elevation angle complies with the angle of application for human body, and the second section of the elevation angle has a maximum elevation angle in parallel to a base seat of the monitor, and the twisting force of the monitor required to rotate within the scope of elevation angle of the second section is larger than that of the elevation angle of the first section, but the twisting force to rotate within the second section is smaller than the weight of the seat body, wherein the first section elevation angle is 5 degree of inclination to 20 degree of elevation angle, and the twisting force for rotation is about 11 to 16 kg/cm, and the second section elevation angle is inclination angle of 20 degree and the elevation angle of 90 degree, and the twisting force for rotation is about 45 to 55 kg/cm.

* * * * *